July 2, 1940.  W. W. SLOANE  2,206,828
CONVEYER
Filed Dec. 10, 1938  3 Sheets-Sheet 1
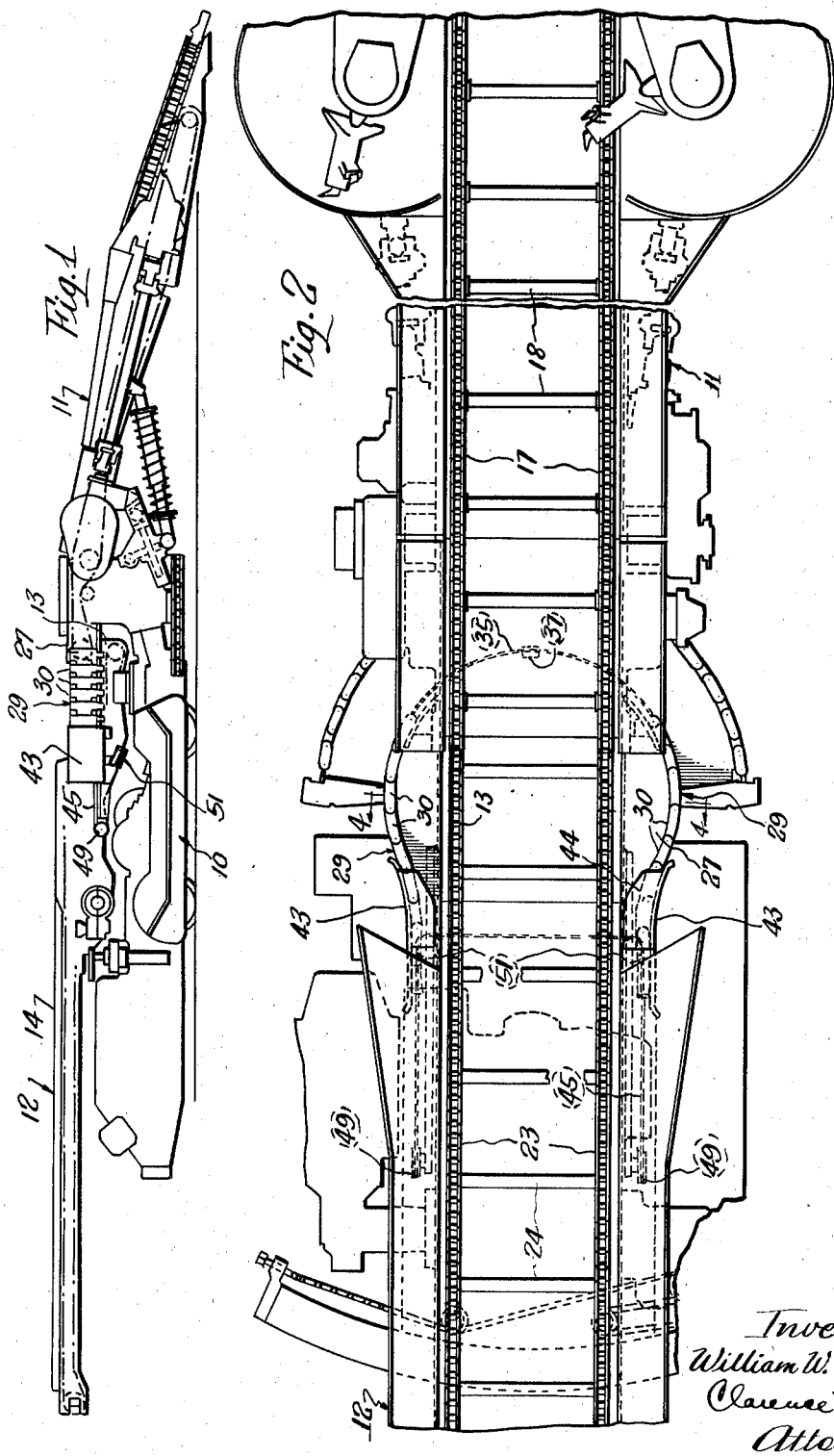
Inventor
William W. Sloane
Clarence F. Poole
Attorney July 2, 1940.  W. W. SLOANE  2,206,828
CONVEYER
Filed Dec. 10, 1938  3 Sheets-Sheet 2
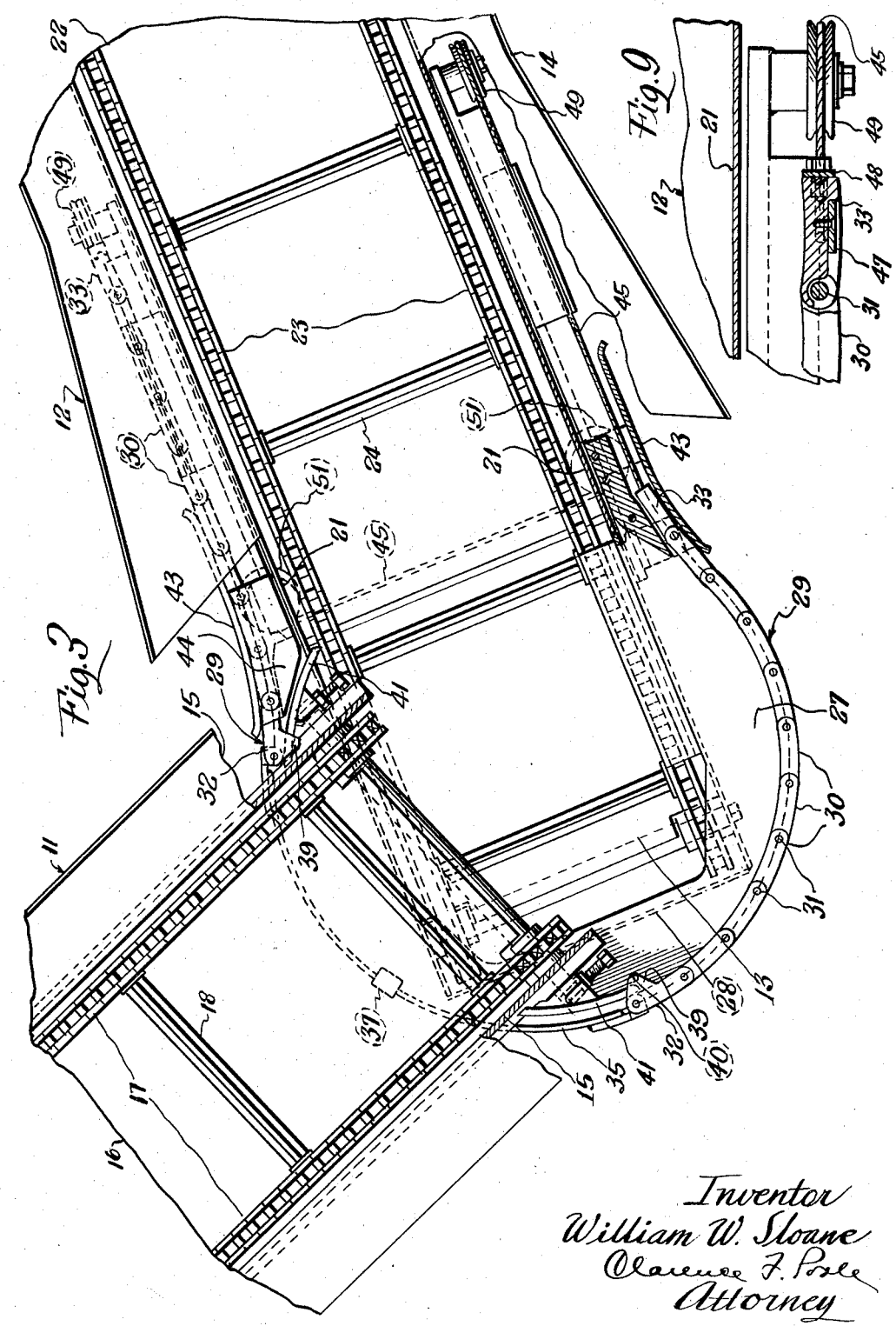

July 2, 1940.  W. W. SLOANE  2,206,828
CONVEYER
Filed Dec. 10, 1938  3 Sheets-Sheet 3
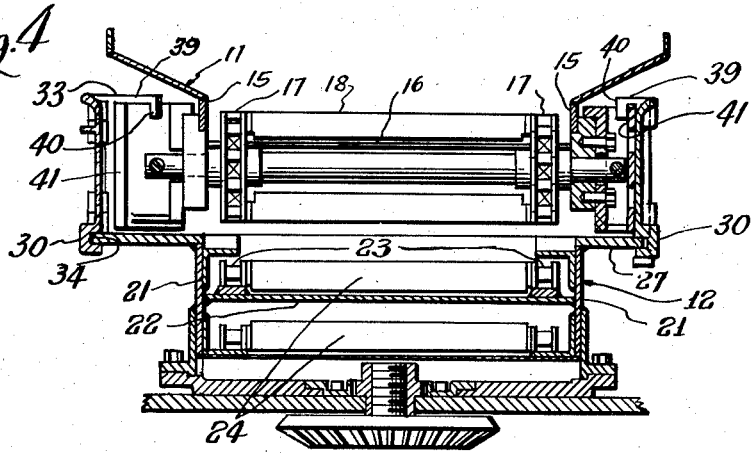
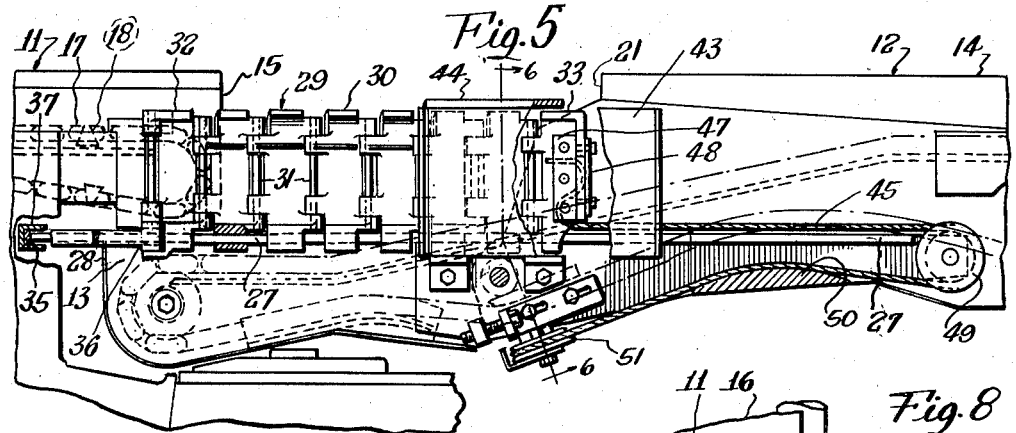
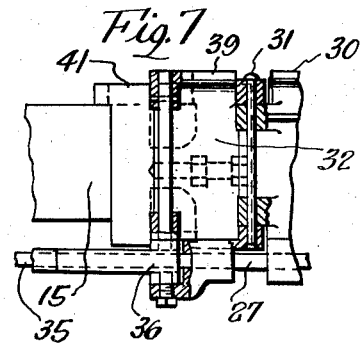
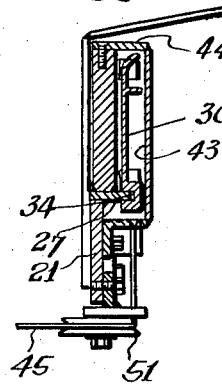
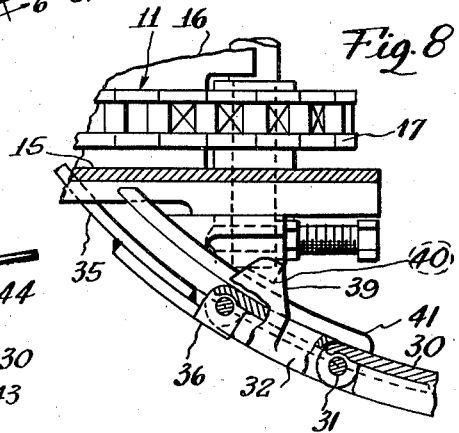
Inventor
William W. Sloane
Clarence J. Poole
Attorney Patented July 2, 1940

2,206,828

UNITED STATES PATENT OFFICE 2,206,828

CONVEYER

William W. Sloane, Chicago, Ill., assignor to Goodman Manufacturing Company, Chicago, Ill., a corporation of Illinois Application December 10, 1938, Serial No. 244,870

16 Claims. (Cl. 198—88)

This invention relates to improvements in conveyors, and more particularly to improvements in an extensible hopper adapted to close the gaps between the adjacent ends of two conveyers, arranged to discharge material from one to the other, when said conveyers are in various angular positions of adjustment with respect to each other, and particularly adapted for use with loading machines of the type operable in confined spaces such as coal mines.

The principal objects of my invention are to provide a novel form of extensible hopper at adjacent ends of a pair of conveyers, one of which is adapted to discharge into the other, which hopper is arranged to form a continuous closed wall between the discharge and receiving conveyers when said conveyers are in various angular positions of adjustment with respect to each other.

Another object of my invention is to provide a simplified form of extensible hopper for retaining material on the receiving conveyer, which is so arranged as to permit a greater range of horizontal movement of the conveyers with respect to each other than formerly, without increasing the length of the extensible side walls of the hopper to an undesirable extent.

Still another object of my invention is to provide a novel form of extensible hopper of the class described, of a simplified and more compact and efficient construction than formerly, which is so arranged as to be wholly supported by and guided for movement about the receiving end of the receiving conveyer.

Other objects of my invention will appear from time to time as the accompanying specification proceeds.

My invention may be more clearly understood with reference to the accompanying drawings wherein:

Figure 1 is a view in side elevation of a loading machine having a flexible hopper constructed in accordance with my invention as a part thereof;

Figure 2 is an enlarged plan view of the machine shown in Figure 1 with the extreme front and rear parts of the machine broken away;

Figure 3 is an enlarged fragmentary plan view of the central portion of the machine, illustrating in detail the hopper arrangement between the two conveyers at the point of discharge from one conveyer to the other, and showing the conveyers in one extreme horizontal position of adjustment with respect to each other, with certain parts broken away and other parts shown in horizontal section;

Figure 4 is an enlarged fragmentary transverse sectional view taken substantially along line 4—4 of Figure 2;

Figure 5 is an enlarged fragmentary view in side elevation of the central portion of the machine at the point of discharge from one conveyer to the other, with certain parts broken away and shown in longitudinal section in order to illustrate certain details of my invention;

Figure 6 is a sectional view taken substantially along line 6—6 of Figure 5;

Figure 7 is an enlarged detail view in side elevation of a portion of the flexible hopper, illustrating certain details thereof;

Figure 8 is an enlarged detail partial plan view of the portion of the hopper shown in Figure 7, illustrating certain details thereof not shown in Figure 7; and Figure 9 is an enlarged detail view in plan of a portion of the extreme rear portion of the hopper in a retracted position, illustrating certain details of construction thereof.

In the drawings, the embodiment of my invention illustrated is shown as being incorporated in a loading machine of the track mounted type particularly adapted for gathering and loading coal in mines. This machine is constructed along lines somewhat similar to those illustrated in a prior application Serial No. 208,969 filed by Frank Cartlidge on May 20, 1938, so will not herein be shown or described in detail, excepting to point out that it includes generally a track mounted truck 10 having an elevating conveyer 11 projecting forwardly from the forward end thereof and a receiving conveyer 12 having its receiving end disposed beneath the discharge end of said elevating conveyer and projecting rearwardly beyond the rear end of said truck for loading material into mine cars or any other suitable material carrying means.

The elevating conveyer 11 is mounted for vertical adjustment about a transverse axis disposed at the forward end of the machine, and forwardly of its discharge end, and the entire conveyer is swingable by power about a vertical axis disposed adjacent the forward end of the machine, to permit the gathering of material from places spaced laterally from the mine rails.

The rear or discharge end of said elevating conveyer is herein shown as being immovable in a vertical direction and as being arranged in cascade relationship with respect to the receiving conveyer 12 for discharging material onto said conveyer. Said receiving conveyer is horizontally adjustable about a vertical axis, and includes a forward receiving or hopper portion 13 and a rear discharge portion 14 pivotally adjustable with respect thereto about a horizontal axis disposed just rearwardly of said hopper portion.

The elevating conveyer 11, as herein shown, is a chain flight conveyer of a type well known to those skilled in the art and includes a pair of side frame members 15, 15 which form side walls therefor, a bottom 16 mounted between said side walls, and a pair of endless chains 17, 17 having spaced apart flights 18, 18 carried therebetween, which are movable along said bottom from the forward to rear end thereof and are trained around suitable direction changing devices at the forward and rear ends of said conveyer.

The receiving conveyer 12 likewise includes a pair of side frame members 21, 21 and a bottom plate 22 along which material is moved towards the discharge end thereof by a pair of parallel spaced endless chains 23, 23, having flights 24, 24 carried therebetween.

With reference now in particular to the novel form of flexible hopper construction between the elevating and discharge conveyers for preventing spillage of material as it is being discharged from one conveyer to the other, a plate 27 of a substantially horseshoe or U-shaped formation is herein shown as being mounted at the receiving end of the conveyer 12 on the tops of the side frame members 21, 21 and forward end 28 of the frame for said receiving conveyer, and extends forwardly and laterally beyond the sides thereof. The forward end and outer sides of said plate are of a continuous arcuate formation and said plate forms a support and guide for a pair of flexible side walls 29, 29 which form side walls for the hopper 13, and which are mounted for slidable movement along the curved outer periphery of said plate and are guided to be retracted along the sides of said receiving conveyer in a manner which will hereinafter more clearly appear as this specification proceeds.

Each flexible side wall 29 includes a plurality of links 30, 30 pivotally connected together at their ends by vertical pivotal pins 31, 31 extending through interleaving projections of said links, and has a forward connecting link 32, and a rearward connecting link 33. Said links, as herein shown, are of an arcuate formation to conform to the arc of the outer periphery of the plate 27 and are of such a height as to extend upwardly from the bottom of the plate 27 to a position just beneath the outwardly flared portion of the side frame members 15, 15 of the elevating conveyer 11 and the side frame members 21, 21 of the receiving conveyer 12, to form continuous extensible side walls between said conveyers. Each of said links is provided with an inwardly recessed channeled guide 34, adjacent its lower end, within which the edge of the plate 27 is adapted to extend, to permit said links to be supported by said plate and slidably move along the outer edge thereof.

The forward connecting links 32, 32 are connected together by a strap 35 which extends beneath the discharge end of said elevating conveyer (see Figures 2, 3, and 8). Said strap is secured at its ends to connecting members 36, 36 which are pivotally connected to the lower ends of said forward connecting links (see Figure 7). A channeled guide 37 at the center of said strap extends inwardly of said strap above and below the top and bottom sides of the plate 27 and forms a guide to guide said strap for movement about the periphery of said plate.

The forward connecting links 32, 32 are each provided with an inwardly projecting portion 39 having a lug 40 depending from the outer end thereof. Each of said lugs has slidable engagement with the inner side of an upright arcuately formed deflecting member 41, which is secured to the side wall 15 of the elevating conveyer 11 adjacent the rearward end thereof, and which extends laterally and rearwardly therefrom in an arcuate path. Said deflecting members, being secured to said side walls at a point spaced a short distance forwardly from the discharge end thereof, form a continuation of the flexible side walls 29, 29 and permit a certain freedom of movement of the elevating conveyer with respect to said flexible side walls. The amount of storage space required for the flexible side walls 29, 29 along the sides of the receiving conveyer 12 is thus reduced and a maximum amount of swinging movement of the two conveyers with respect to each other is attained without necessitating an increase in length of said flexible side walls to an undesirable extent. It should be understood that upon engagement of either of the side frame members with either of the forward end links 32, 32 of either flexible side wall 29, and upon swinging movement of either conveyer, that both of said flexible side walls will be moved along the periphery of the plate 27 and one will be retracted along the side of the receiving conveyer 12 while the opposite side wall will be extended from the opposite side of said receiving conveyer by means of the strap 35.

The rear ends of the flexible side walls 29, 29 extend into channeled guides 43, 43 extending along opposite sides of the receiving conveyer and forming guides which conform to the path of said endless chains to guide said chains along the sides of the conveyer 12. As shown in Figures 5 and 6, the plate 27 extends into and beyond said guides along the sides of the conveyer 12. A cover member 44 is provided to cover said guides at the top to prevent the accumulation of fine coal therein.

A tensioning means is provided to tension the flexible side walls 29, 29 and hold the links 30, 30 and guides 34, 34 in engagement with the plate 27. Said tensioning means, as herein shown, comprises a flexible cable 45 connected at its ends to the rear connecting links 33, 33 (see Figures 3, 5 and 9). Each end of said tensioning member is secured to the respective rear connecting link 33 by means of clamping plates 47 and 48, engaging said member (see Figures 5 and 9). Said tensioning member is trained rearwardly from opposite rear connecting links 33, 33 to and around sheaves 49, 49 mounted on opposite sides of the frame for the receiving conveyer 12. From said sheaves said tensioning member extends forwardly over guides 50, 50 on opposite sides of the frame for said receiving conveyer, to and around sheaves 51, 51, herein shown as being disposed just rearwardly of the hopper portion 13 of said conveyer, and mounted for rotation about an axis perpendicular to the plane of inclination of said conveyer. Upon retraction of one flexible side wall 29, said side wall extends the opposite side wall through the strap 35 and the extending side wall at the same time exerts tension on the retracting side wall and tends to retract it along the respective side of the receiving conveyer 12 by means of the tensioning member 45.

It may be seen from the foregoing that a flexible hopper has been provided between two conveyers which are arranged in cascade relationship with respect to each other so that one conveyer will discharge into the forward or receiving end of the other, which hopper forms a closed wall between said conveyers when they are in various positions of adjustment with respect to each other.

It may also be seen that this hopper is mounted wholly on the receiving end of the receiving conveyer on the plate 27, and is supported independently of the elevating conveyer for movement about said plate by engagement of the side walls 15, 15 of said elevating conveyer with either end of said connecting link 32.

It may likewise be seen that the arrangement is such as to permit a predetermined amount of movement of the elevating conveyer with respect to the receiving conveyer, before causing movement of said flexible side walls about the periphery of the plate 27, and thus enabling the use of side walls of a shorter length than would be necessary if said side walls were directly connected to the side walls of said elevating conveyer, and providing a novel and more compact form of flexible hopper than formerly.

While I have herein shown and described one form in which my invention may be embodied, it will be understood that the construction thereof and the arrangement of the various parts may be altered without departing from the spirit and scope thereof. Furthermore, I do not wish to be construed as limiting myself to the specific embodiment illustrated, excepting as it may be limited in the appended claims.

I claim as my invention:

1. In a conveying mechanism, two conveyors having their adjacent ends in cascade relationship, one of said conveyors being horizontally swingable with respect to the other, and an extensible hopper at the receiving end of the receiving conveyer including a member extending around the receiving conveyer and having an outer periphery of an arcuate formation, and a pair of flexible side walls connecting opposite sides of said conveyers together, each of said side walls including a plurality of upright links pivotally connected together and each of said links having an inwardly facing channelled guide adapted to slidably engage the outer periphery of said member, and tensioning means engaging one end of each of said side walls, for holding said guides in engagement with said member.

2. In a conveying mechanism, two conveyers having their adjacent ends in cascade relationship, one of which is horizontally swingable with respect to the other, and an extensible hopper at the receiving end of the receiving conveyer including a member extending around the receiving conveyer and having an outer periphery of an arcuate formation, and a pair of flexible side walls connecting opposite side walls of said conveyers together, each of said side walls including a plurality of upright links pivotally connected together and guided for movement around the periphery of said member and an end link adapted to be engaged by the discharge conveyer for retracting said side wall, a strap slidably mounted on said member and connecting opposite end links together, and a tensioning member connecting the end links at the opposite ends of said side walls together.

3. In a conveying mechanism, two conveyers having their adjacent ends in cascade relationship, one of said conveyers being horizontally swingable with respect to the other, and an extensible hopper at the receiving end of the receiving conveyer including a member extending around the forward end of said receiving conveyer and having an outer periphery of an arcuate formation, and a pair of extensible side walls guided for movement about the outer periphery of said member for closing the gaps between opposite side walls of said conveyers, said side walls being adapted to be engaged at one of their ends with opposite sides of said discharge conveyer, a strap guided for movement about the periphery of said first mentioned member and connecting the ends of said side walls adjacent said discharge conveyer together, a tensioning member connecting the opposite ends of said side walls together, and said side walls including a plurality of upright links pivotally connected together and having slidable engagement with the periphery of said member at their lower ends.

4. In a conveying mechanism, two conveyers having their adjacent ends in cascade relationship, one of said conveyers being horizontally swingable with respect to the other, and an extensible hopper at the receiving end of the receiving conveyer including a member extending around the forward end of said receiving conveyer and having an outer periphery of an arcuate formation, and a pair of extensible side walls guided for movement about the outer periphery of said member for closing the gaps between opposite side walls of said conveyers, said side walls being adapted to be engaged at one of their ends with opposite sides of said discharge conveyer, a strap guided for movement about the periphery of said member and connecting the ends of said side walls adjacent the discharge conveyer together, a tensioning member connecting the opposite ends of said side walls together, and said side walls including a plurality of upright links pivotally connected together and having inwardly extending guides at the lower ends thereof adapted to engage the top and bottom surfaces of said member and form a means for guiding and supporting said links for movement about the periphery of said member.

5. In a conveying mechanism, two conveyers having their adjacent ends in cascade relationship, one of said conveyers being horizontally swingable with respect to the other, and an extensible hopper at the receiving end of the receiving conveyer including a member extending around the receiving conveyer and beyond the forward end and sides thereof and a plurality of upright links pivotally connected together and guided for movement around said member and forming flexible side walls connecting opposite sides of said conveyers together, a guiding and deflecting member extending laterally and rearwardly from each side wall of said discharge conveyer adjacent the rearward end thereof, and a slidable guiding connection between said members and the end links of said side walls adjacent said discharge conveyer to permit pivotal movement of said discharge conveyer a predetermined distance while said side walls remain stationary.

6. In a conveying mechanism, two conveyers having their adjacent ends arranged in cascade relationship, one of said conveyers being horizontally swingable with respect to the other, and an extensible hopper at the receiving end of the receiving conveyer including a member extending around the receiving conveyer and having an outer periphery of an arcuate formation, and a pair of extensible side walls guided for movement about said member and connecting opposite side walls of said conveyers together, each of said side walls including a plurality of upright links pivotally connected together and guided for movement around the periphery of said member and having end links adapted to be engaged by one of said conveyers, and a guiding and deflecting member extending laterally and rearwardly from each side of the discharge conveyer adjacent the rearward end thereof, said deflecting members having guiding engagement with said end links to permit a predetermined freedom of movement of said discharge conveyer with respect to said receiving conveyer without causing movement of said links.

7. In a conveying mechanism, two horizontally swingable conveyers having their adjacent ends in cascade relationship, and an extensible hopper at the receiving end of the receiving conveyer including a member extending around the receiving conveyer and beyond the forward end and sides thereof, a pair of flexible side walls guided for movement around said member and connecting the gaps between the side walls of said conveyers, each of said side walls including a plurality of interconnected upright links, a guide extending along each side of said receiving conveyer for supporting said links, and tensioning means connecting the ends of said links adjacent said receiving conveyer together, a strap slidably guided about the periphery of said member for connecting the opposite ends of said side walls together, a guiding and deflecting member extending laterally and rearwardly from each side of said discharge conveyer from a point disposed adjacent the rearward end thereof, and a guiding connection between said members and the end links of said side walls adjacent said discharge conveyer, to permit pivotal movement of said discharge conveyer a predetermined distance while said side walls remain stationary and to reduce the space required for storing said side walls along the sides of said receiving conveyer.

8. In a conveying mechanism, two conveyers having their adjacent ends in cascade relationship so that one may discharge into the other, one of said conveyers being horizontally swingable with respect to the other, and an extensible hopper extending around the receiving end of said receiving conveyer and extensible from the sides thereof, said hopper being wholly supported by said receiving conveyer and retracted or extended with respect thereto by engagement with the sides of said discharge conveyer and including a plate mounted on and extending around the forward end of said receiving conveyer, and a plurality of upright links guided for movement about said plate and pivotally connected together and interposed between opposite side walls of said conveyers, each of said links having a channelled guide adjacent the lower end thereof, open towards said plate and engaging the outer periphery of said plate for movement thereabout, and tensioning means for holding said guides in engagement with said plate.

9. In a conveying mechanism, two conveyers having their adjacent ends in cascade relationship so that one may discharge into the other, one of said conveyers being horizontally swingable with respect to the other, and an extensible hopper extending around the receiving end of said receiving conveyer and extensible from the sides thereof, said hopper being wholly supported by said receiving conveyer and retracted or extended with respect thereto by engagement with the sides of said discharge conveyer and including a plate mounted on and extending around the forward end of said receiving conveyer, a plurality of upright links guided for movement about said plate and pivotally connected together and interposed between opposite side walls of said conveyers, and means for extending said links on one side of the conveyer while the links on the opposite side of the conveyer are being retracted including selective abutting connections between said discharge conveyer and opposite of said forwardmost links, means extending beneath said discharge conveyer for connecting opposite forwardmost links together in fixed spaced relation with respect to each other, and other means connecting opposite rearwardmost links together.

10. In a conveying mechanism, two conveyers having their adjacent ends in cascade relationship so that one may discharge into the other, one of said conveyers being horizontally swingable with respect to the other, and an extensible hopper extending around the receiving end of said receiving conveyer and extensible from the sides thereof, said hopper being wholly supported by said receiving conveyer and retracted or extended with respect thereto by engagement with the sides of said discharge conveyer and including a plate mounted on and extending around the forward end of said receiving conveyer, a plurality of upright links guided for movement about said plate and pivotally connected together and interposed between opposite side walls of said conveyers, and means for extending said links on one side of the conveyer while the links on the opposite side of the conveyer are being retracted including selective abutting connections between said discharge conveyer and opposite of said forwardmost links, means extending beneath said discharge conveyer for connecting opposite forwardmost links together in fixed spaced relation with respect to each other, and a tensioning member guided beneath said receiving conveyer for connecting opposite rearwardmost links together.

11. In a conveying mechanism, two conveyers having their adjacent ends in cascade relationship so that one may discharge into the other, one of said conveyers being horizontally swingable with respect to the other, and an extensible hopper extending around the receiving end of said receiving conveyer and extensible from the sides thereof, said hopper being wholly supported by said receiving conveyer and retracted or extended with respect thereto by engagement with the sides of said discharge conveyer and including a plate mounted on and extending around the forward end of said receiving conveyer, a plurality of links guided for movement around the periphery of said plate and pivotally connected together and interposed between opposite side walls of said conveyers, and means for extending said links on one side of the conveyer while the links on the opposite side of the conveyer are being retracted including a strap guided for movement around said plate and extending beneath said discharge conveyer and connecting opposite forwardmost links together, and a tensioning member guided beneath said receiving conveyer and connecting opposite rearwardmost links together.

12. In a conveying mechanism, two conveyers having their adjacent ends in cascade relationship so that one may discharge into the other, one of said conveyers being horizontally swingable with respect to the other, and an extensible hopper extending around the receiving end of said receiving conveyer and extensible from the sides thereof, said hopper being wholly supported by said receiving conveyer and retracted or extended with respect thereto by engagement with the sides of said discharge conveyer and including a plate mounted on and extending around the forward end of said receiving conveyer, a plurality of links guided for movement around the periphery of said plate and pivotally connected together and interposed between opposite side walls of said conveyers, and means for extending said links on one side of the conveyer while the links on the opposite side of the conveyer are being retracted including a strap guided for movement around said plate and extending beneath said discharge conveyer and connecting opposite forwardmost links together, and a tensioning member guided beneath said receiving conveyer and connecting opposite rearwardmost links together, and means permitting a predetermined movement of said discharge conveyer independently of movement of said links including a pair of arcuate deflecting members, said members extending laterally and rearwardly from opposite sides of said discharge conveyer and having a guiding connection with the forwardmost links of said deflecting members.

13. In a conveying mechanism, two horizontally swingable conveyers, and means connecting the side walls of said conveyers for guiding material from one conveyer to the other when said conveyers are in varying positions of adjustment with respect to each other including a pair of flexible side walls, each of said side walls including a plurality of interconnected upright links guided for movement about the end of one of said conveyers and an end link adapted to be engaged by the other conveyer, whereby swinging movement of either of said conveyers will cause retractive movement of one of said side walls, flexible tensioning means connecting the ends of said side walls opposite from said end links together, and a strap extending beneath said movable conveyer and connecting said end links together to permit the retracting side wall to extend the opposite side wall.

14. In a conveying mechanism, two conveyers, one of which is horizontally swingable with respect to the other, and means connecting the side walls of said conveyers for guiding material from one conveyer to the other when said conveyers are in varying positions of adjustment with respect to each other including a pair of flexible side walls, each of said side walls including a plurality of interconnected upright links guided for movement about the end of the receiving conveyer and an end link adapted to be engaged by the discharge conveyer whereby swinging movement of the swingable conveyer will cause retractive movement of said side wall, flexible means connecting the opposite ends of said flexible side walls together, and a strap extending beneath said discharge conveyer and connecting said end links together to permit the retracting side wall to extend the opposite side wall.

15. In a conveying mechanism, two conveyers, one of which is horizontally swingable with respect to the other, and means connecting the side walls of said conveyers for guiding material from one conveyer to the other when said conveyers are in varying positions of adjustment with respect to each other including a plate mounted at the receiving end of one conveyer and having an outer periphery of an arcuate formation spaced beyond the sides and forward end of said conveyer, a pair of extensible side walls connecting opposite sides of said conveyer together, each of said side walls being guided for movement around the periphery of said plate and including a plurality of interconnected upright links, each of said links having a channelled guide adjacent its lower end open towards the inside of the conveyer and adapted to slidably engage the outer periphery of said plate, and tensioning means connecting opposite side walls together and holding said guides in engagement with said plate.

16. In a conveying mechanism, two conveyers, one of which is horizontally swingable with respect to the other, and means connecting the side walls of said conveyers for guiding material from one conveyer to the other when said conveyers are in varying positions of adjustment with respect to each other including a plate mounted at the receiving end of said receiving conveyer and having an outer periphery of an arcuate formation extending beyond the sides and forward end of said conveyer, a pair of extensible side walls connecting the gap between opposite side walls of said conveyers, each of said side walls being guided for movement around the periphery of said plate and including a plurality of interconnected upright links having guiding engagement with the periphery of said plate, and end links adapted to be engaged by opposite sides of the discharge conveyer whereby swinging movement of either of said conveyers will cause retractive movement of said respective side wall, flexible means connecting the opposite ends of said side walls together and forming a tensioning means therefor, and a strap guided for movement along said plate and connecting said end links together so that retractive movement of one side wall will cause extensible movement of the other.

WILLIAM W. SLOANE.